United States Patent
Loyd et al.

(10) Patent No.: US 7,957,364 B2
(45) Date of Patent: Jun. 7, 2011

(54) DETERMINING NETWORK PATHS

(75) Inventors: Aaron J. Loyd, Cupertino, CA (US); Srikanth Natarajan, Cupertino, CA (US); Dipankar Gupta, Cupertino, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1037 days.

(21) Appl. No.: 11/338,528

(22) Filed: Jan. 24, 2006

(65) Prior Publication Data
US 2007/0171844 A1    Jul. 26, 2007

(51) Int. Cl.
*H04L 12/28* (2006.01)
(52) U.S. Cl. ........................ 370/351; 370/248
(58) Field of Classification Search .............. 370/248, 370/252, 351–356, 389, 396, 400; 709/223
See application file for complete search history.

(56) References Cited

U.S. PATENT DOCUMENTS

| | | | | |
|---|---|---|---|---|
| 5,675,741 A * | 10/1997 | Aggarwal et al. | ............ | 709/242 |
| 6,115,385 A * | 9/2000 | Vig | ............... | 370/401 |
| 6,304,912 B1 * | 10/2001 | Oguchi et al. | ............... | 709/238 |
| 6,490,618 B1 * | 12/2002 | Ferguson et al. | ............ | 709/223 |
| 6,538,997 B1 * | 3/2003 | Wang et al. | .................. | 370/241 |
| 6,898,183 B1 | 5/2005 | Garakani | ...................... | 370/238 |
| 2006/0182034 A1 * | 8/2006 | Klinker et al. | ............... | 370/238 |

* cited by examiner

*Primary Examiner* — Andrew Lai (57) ABSTRACT

In an embodiment of a method of tracing a path through a switch mesh from a first device connected to the switch mesh to a second device connected to the switch mesh, hardware addresses of the first and second devices are obtained. At least one switch that is a neighbor to the first device is identified. At least one switch that is a neighbor to the first device is queried to identify at least one port of at least one switch that is forwarding packets having the hardware addresses of the first and second devices.

24 Claims, 6 Drawing Sheets

DETERMINING NETWORK PATHS

BACKGROUND

In computer and other networks, communication between two end-users or other resources may pass through a series of intervening devices, the principal function of which is to forward communications to their intended destination. It is frequently desired to know by what path communication is passing between two devices through the network. For example, if an end-user device is malfunctioning or sending out undesirable communications traffic, the system operator may wish to know exactly where the offending device is connected to the network, so that the offending device can be disconnected without also disconnecting other users or resources.

There may be many physically possible paths, and even many reasonable paths, between any two end-points on a network. The path actually used may vary, depending on the availability of specific forwarding devices, the level of other traffic on particular links, and other ephemeral considerations.

In the internet and similar networks, the Open System Interconnection (OSI) layer 3 "network layer" handles packet routing in software that allows a considerable amount of communication about the packets being routed. For example, in Internet Protocol (IP), the layer 3 routers along a path to or from a device doing the tracing can be traced by sending "traceroute" packets that are addressed to the end-point, but are designed to travel only a limited number of steps before "timing out" and triggering an error message returned to the sender. By varying the number of steps before different packets time out, the sender can ideally obtain a complete list of the routers along the path.

Some network protocols use a packet header that includes the network addresses of the routers that have handled, or are intended to handle, the packet. In those protocols, "sniffer" software can obtain the path between two devices in communication by inspecting the headers of packets in transit.

However, two successive layer 3 routers, or the last layer 3 router and the end-point, may be connected by a "switch mesh" of switches, operating at the OSI layer 2 "data link" layer. A switch typically has several ports, each connected to one or more neighbor switches, and a Forwarding Database Table (FDB) that lists what devices outside the switch mesh can be reached through each port. Outside devices connected to a switch mesh may include layer 3 routers as well as end-user devices and other resources. The FDB typically identifies each device by its Medium Access Control (MAC) address, which is an identifying number permanently assigned to the device. Layer 2 switches do not respond to layer 3 stratagems such as traceroute, but mechanically forward any incoming packet for which an outgoing port can be identified.

A switch mesh of switches can be "discovered" by a Network Management System (NMS) querying each switch in turn, obtaining the connection information from the FDB, and constructing an image of the switch mesh. The listing of physically available connections from a discovery is usually fairly stable. However, because the individual switches are dynamically maintaining the paths actually used locally, discovered information on paths actually in use rapidly becomes out of date. Discovery being a resource-intensive operation, it is often not practical to discover a switch mesh sufficiently frequently to maintain an up-to-date image of the actual paths.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION

Reference will now be made in detail to various embodiments of the present invention, example of which is illustrated in the accompanying drawings.

Figure 1:
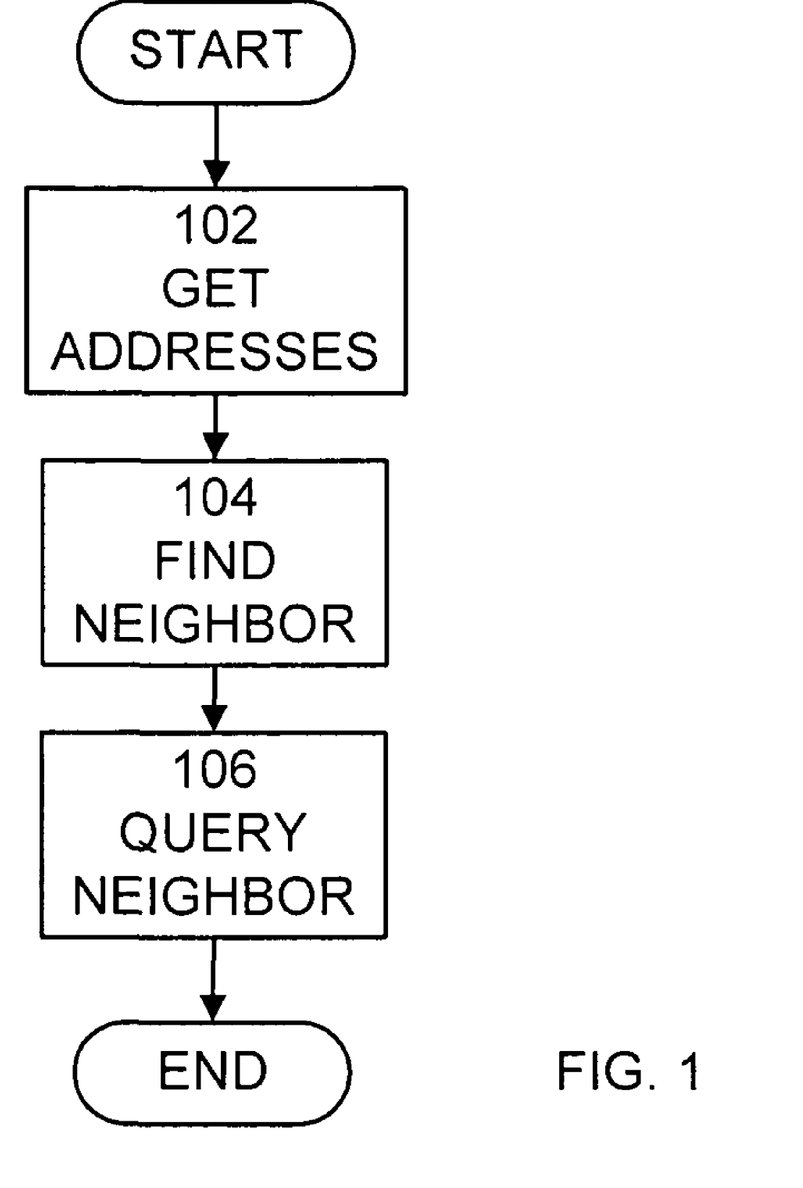
FIG. 1 is a flowchart of a first embodiment of a method according to the invention.

Referring initially to FIG. 1, in one embodiment of a method of tracing a path through a switch mesh from a first device connected to the switch mesh to a second device connected to the switch mesh, in step 102 hardware addresses of the first and second devices are obtained.

In step 104 at least one switch that is a neighbor to the first device is identified.

In step 106, at least one switch that has been identified as a neighbor to the first device is queried to identify at least one port that is forwarding packets having the hardware addresses of the first and second devices.

Figure 2:
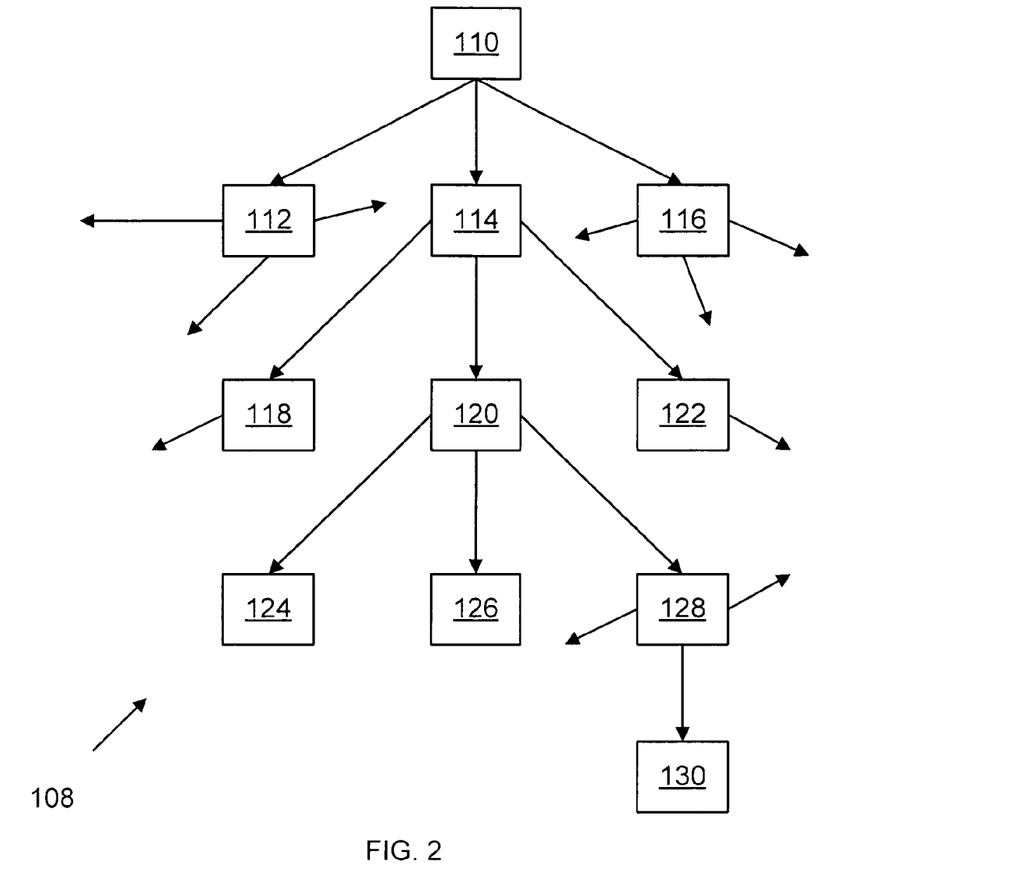
FIG. 2 is a diagram of a first embodiment of a switch mesh.

Referring to FIG. 2, in one embodiment of a switch mesh 108 a first device 110 is connected to one or more switches 112, 114, and 116. Each of the switches 112, 114, 116 is connected to several further switches or other devices, as symbolized by arrows in FIG. 2. One of the switches 120 is connected to further switches 124, 126, 128. Switch 128 is connected to several further switches or other devices, including second device 130. The switch mesh 108 may have fewer or more than three switches 114, 120, 128 in a direct path between first device 110 and second device 130. The switch mesh 108 may have more than one direct path between first device 110 and second device 130.

Figure 3:
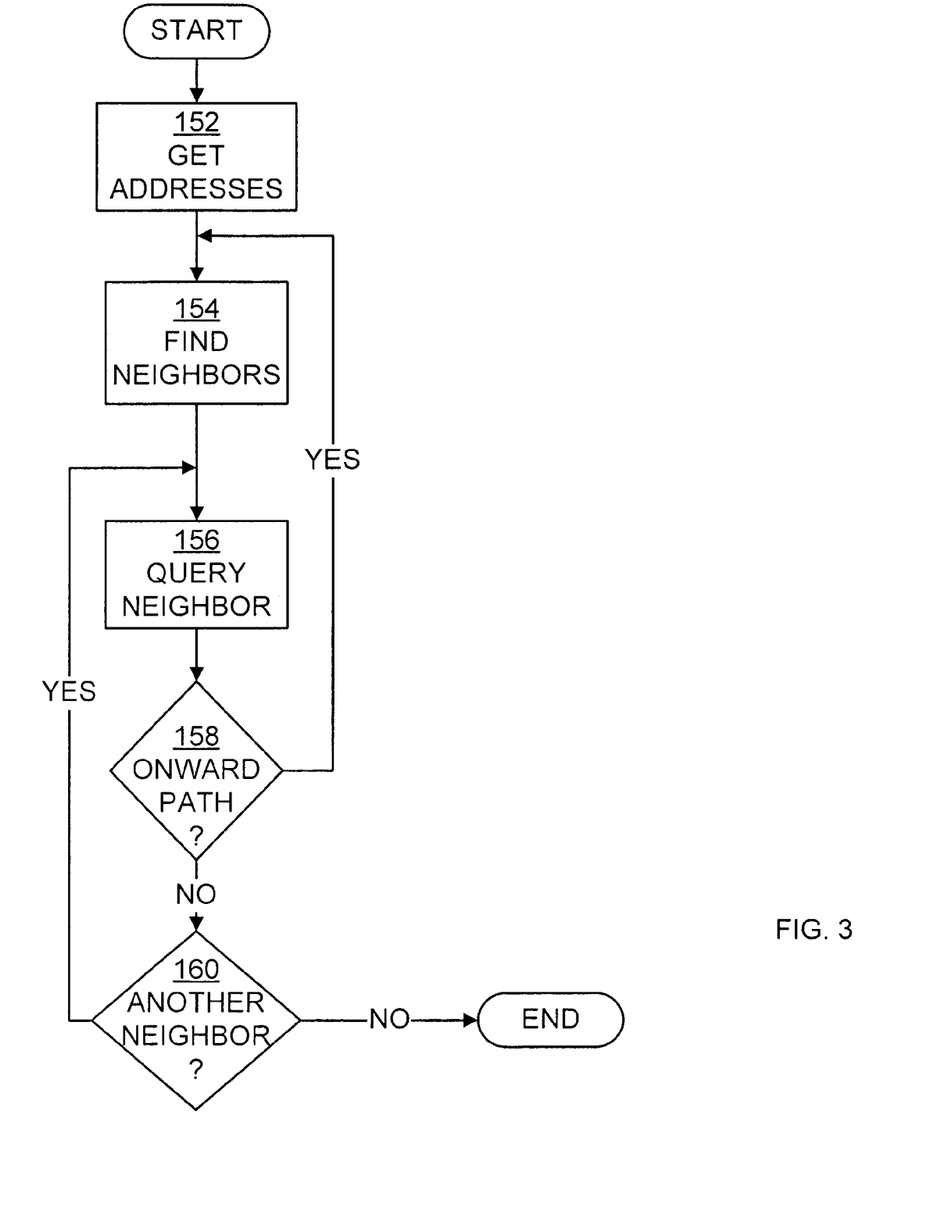
FIG. 3 is a flowchart of a second embodiment of a method according to the invention.

Referring to FIG. 3, in a second embodiment of a method of tracing a path through a switch mesh 108 from a first device 110 connected to the switch mesh 108 to a second device 130 connected to the switch mesh 108, in step 152 hardware addresses of the first and second devices 110, 130 are obtained. Where the switch mesh 108 is part of a network (not shown) using the Internet Protocol (IP), the hardware addresses may be obtained using the IP Address Resolution Protocol (ARP), under which the process broadcasts the IP address of each device and requests the device to reply with its hardware address.

The first device 110 may be a router that provides access from a larger network, in which a device running the process is located, to the switch mesh 108. In that case, the process will at least initially trace the path through the switch mesh 108 from the router 110 to the second device 130. The second device 130 may then be an end device attached to the switch mesh 108. Alternatively, the second device 130 may be another router, and the process may be tracing the path through the switch mesh 108 from the first router 110 to the second router 130.

Alternatively, the first and second devices 110, 130 may both be end devices attached to the switch mesh 108. In that case, a previous run of the process shown in FIG. 3 may have found a path to the first device 110 through the switch mesh 108 from an access router (not shown).

In step 154 the switches 112, 114, 116 that are neighbors to the first device 110 are identified. The neighbor switches 112, 114, 116 may be identified by requesting a Network Management System that has previously discovered the switch mesh 108 to provide a list. The list may specify all switches 112, 114, 116 that are, or were at the time of discovery, physically connected to the first device 110, or to a specified port on the first device 110. Alternatively, where the first device 110 is an end device traced by a previous run of the process, the process may assume in step 154 that the last switch 114 found in the previous run is the only switch 114 that is a neighbor to the first device.

In step 156, a first one of those neighbor switches 112 is queried for its status and for information, for example, from a Forwarding Database Table (FDB) indicating what device hardware addresses the switch 112 is forwarding communications between the first and second devices. Depending on the internal arrangements of the switch 112 queried, the switch 112 queried may return a dump of part or all of its FDB. Alternatively, the switch 112 may be able to respond directly to a query asking whether it is forwarding communications between the first and second devices.

In step 158 the process determines whether or not the switch 112 queried is actively forwarding communications between the hardware addresses of the first and second devices 110, 130, and thus forms part of the onward path.

If the switch 112 queried in steps 156 and 158 is not in the path, or if there may be more than one path and the process is attempting to find all paths, then in step 160 the process checks whether the first device 110 has another neighbor switch 114 that has not yet been queried. If so, the process loops back and repeats steps 156, 158 for the new switch 114. The switch mesh 108 may use a protocol, for example, a Spanning Tree Protocol, to ensure there is only one active path between two endpoints such as first devices 110, 130. Where the process shown in FIG. 3 trusts that protocol, the process may assume there is only one active path. The process may then branch out of the loop 156, 158, 160 at step 158 as soon as a neighbor that forms part of an onward path is found.

When the process has completed steps 156, 158, 160 for all the switches 112, 114, 116 that are neighbors to the first device 110 and found at least one onward path, or when the process has found an onward path in step 118 and does not continue searching for a second path, the process loops to step 154.

In the repeat of step 154, the switch 114 that has been identified as carrying the onward path takes the place of the first device 110, and the further switches 118, 120, 122 that are neighbors of the switch 114 are identified. The loop of steps 156, 158, 160 is then repeated for the new neighbor switches 118, 120, 122. Where more than one switch 114 was identified as carrying an onward path, the repeat of step 154 and all subsequent steps are carried out in parallel for each alternative onward switch 114, until one of the paths is found to be a dead end or it is confirmed there is more than one valid path.

The process loops of steps 154, 156, 158, 160 are repeated for switches 124, 126, 128, and as often as necessary for the actual path being traced. Eventually a switch 128 is reached that has no neighbor switch that carries the onward path. It is therefore concluded that switch 128 is connected to second device 130 either directly or through a further "mystery" switch (not shown) that is not in the NMS image of the discovered switch mesh 108, and the process terminates.

Figure 4:
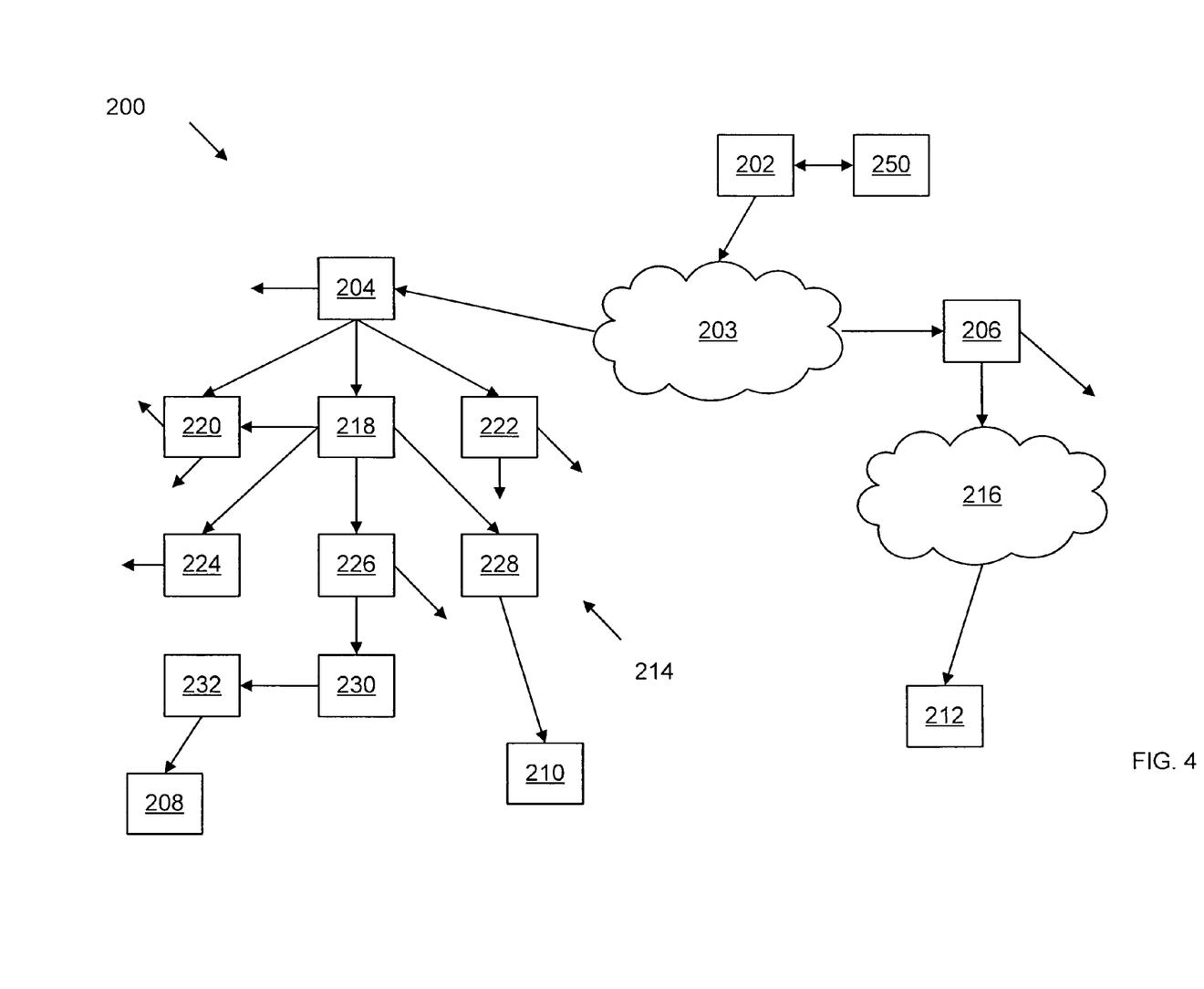
FIG. 4 is a diagram of a second embodiment of a switch mesh.

Referring now to FIG. 4, a second embodiment of a network 200 comprises an operator's console 202 connected through a network 203 (not shown in detail) to layer 3 routers 204, 206. The router 204 is connected to nodes, including nodes 208, 210 through layer 2 switch mesh 214 without any intervening layer 3 device. The router 206 is connected to nodes including node 212 through layer 2 switch mesh 216 without any intervening layer 3 device.

Switch mesh 214 includes switches 218, 220, 222 that are neighbors directly connected to router 204. Switches 2224, 226, 228 are neighbors to switch 218. Switch 230 is neighbor to switch 226. Switch 232 is neighbor to switch 230. Node 208 is connected to switch 232. Switch mesh 214 may include other switches (not shown). Some connections to other switches are shown symbolically by arrows from some of the shown switches. Switch mesh 216 is not shown in detail, but may be generally similar to switch mesh 214.

Routers 204, 206 may have several interfaces to other switch meshes (not shown) as well as switch meshes 214, 216. Different interfaces may connect to addresses with distinct sub-net masks.

Information concerning the structure and connections of the network is stored in a Network Management System (NMS) 250 accessible to the console 202.

Figure 5A:
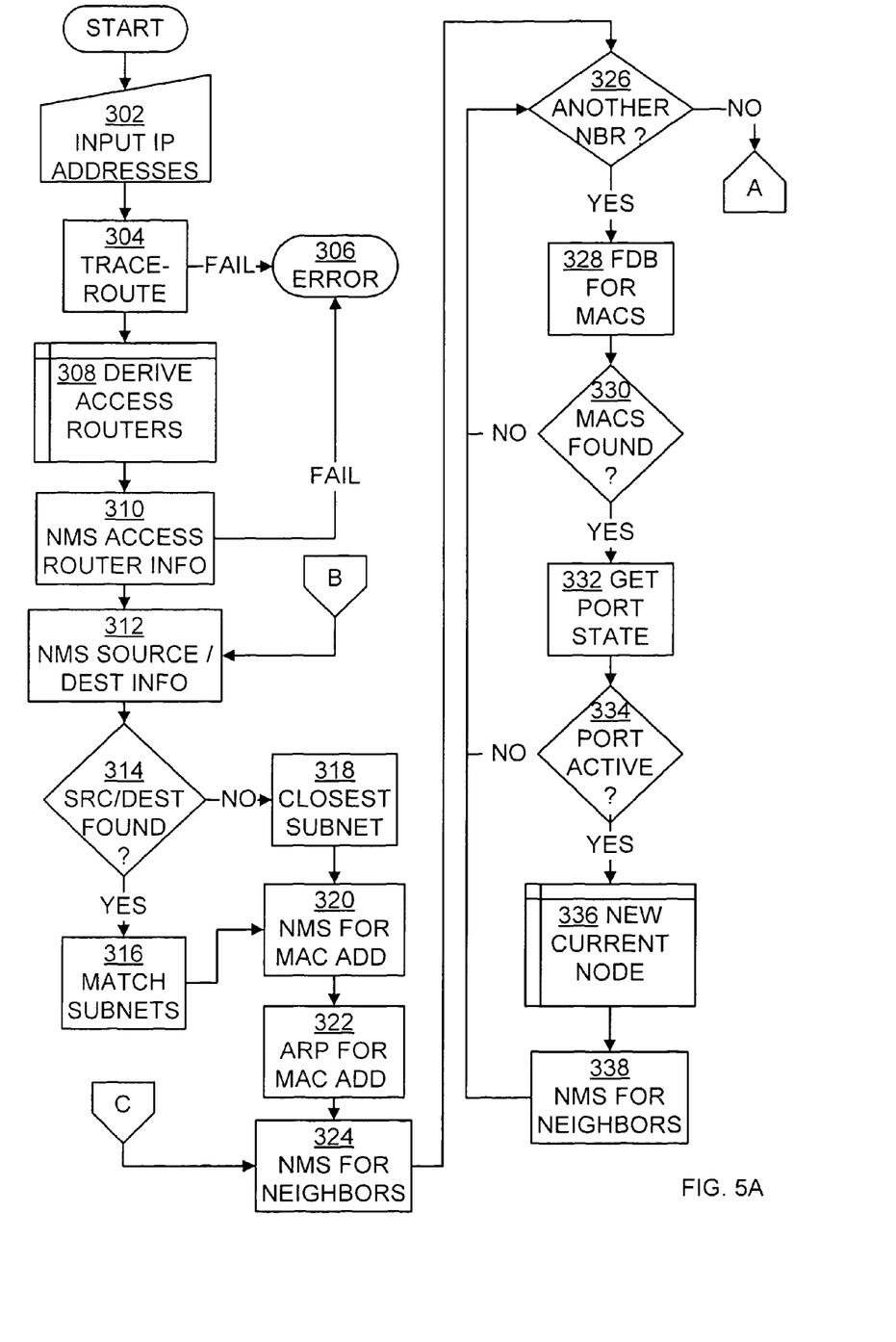
FIGS. 5A and 5B are a flowchart of a third embodiment of a method according to the invention.
Figure 5B:
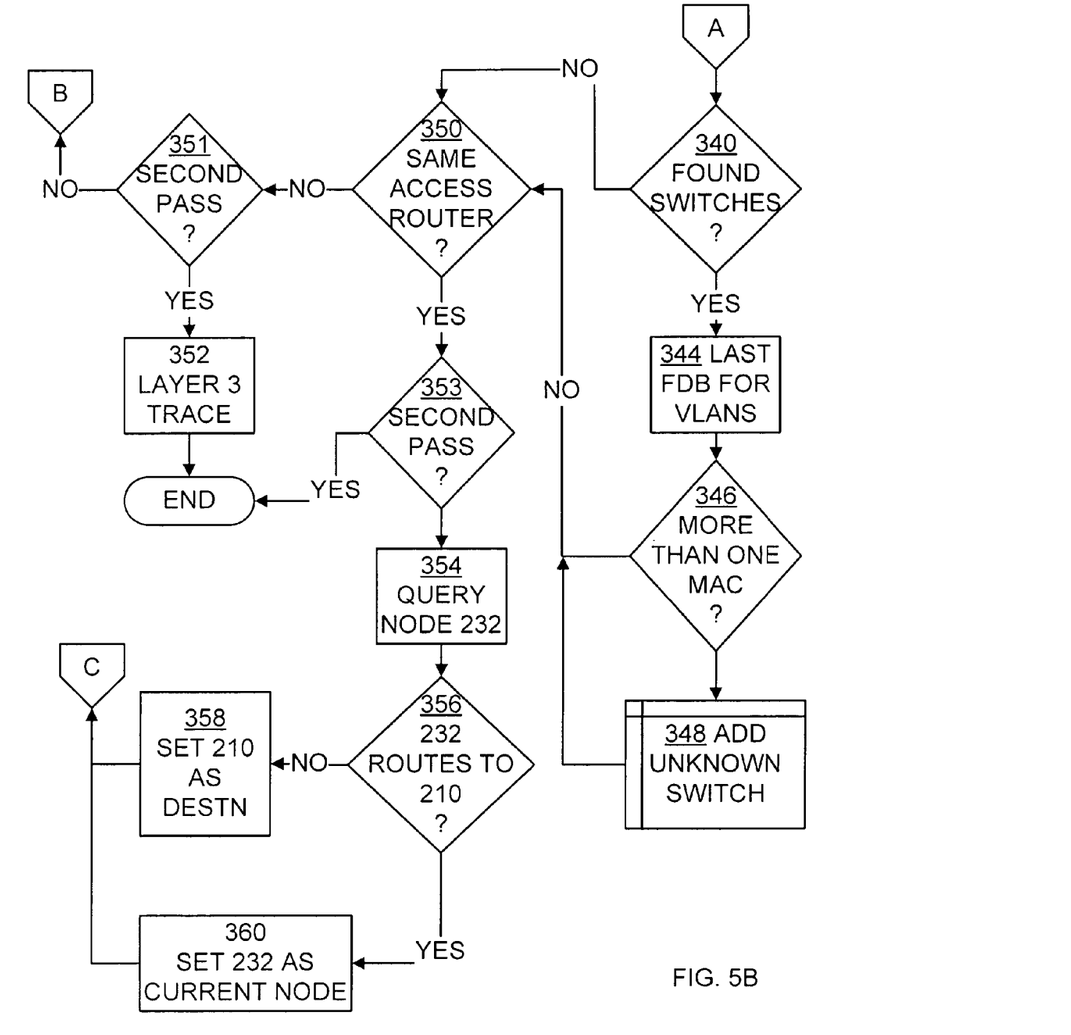

Referring now to FIGS. 5A and 5B (collectively FIG. 5), a third embodiment of a method according to the invention is usable for tracing a path between two nodes, a source node 208 and a destination node 210 or 212. The two nodes may be nodes 208, 210 connected to the same switch mesh 214, or nodes 208, 212 connected to different switch meshes 214, 216. In step 302, source and destination addresses for the two nodes 208, 210 or 208, 212 are provided. In an example, the addresses are Internet Protocol (IP) addresses.

In step 304, a layer 3 utility such as traceroute is used to find network paths from the operator's console 202 to the two nodes. Because traceroute is a layer 3 utility, traceroute finds the routers 204, 206 but not the switches 218, etc. between the routers 204, 206 and the source and destination nodes 208, 210, 212. If traceroute fails to find valid paths to the two nodes from which at least the router 204 can be identified, the process fails and terminates in step 306. An error message may be sent to the console 202 to indicate the reason for the termination.

In step 308, the traceroute paths are analyzed to find the required routers 204 and, if applicable, 206. In step 310, the NMS is queried for information on router 204. If router 204 is not in the NMS, the process fails and terminates in step 306. Where the process terminates in step 306, the NMS may be sufficiently incomplete that a discovery of the network is desirable before the present process is repeated.

In step 312, the source node 208 is set as a target node for the process, and the NMS 250 is queried for information on the target node 208. In step 314, the process determines whether target node 208 is in the NMS 250 and the NMS 250 has a subnet associated with target node 208. If the subnet information is available, then in step 316 the interface on router 204 that routes to that subnet is selected for subsequent steps of the process. If the subnet information for target node 208 is not available on the NMS 250, then in step 318 the forwarding tables of router 204 are queried to determine which interface of router 204 forwards to a subnet including the IP address of target node 208. If the query to the forwarding tables of router 204 fails, then a "public" interface of router 204 may be used, or each interface of router 204 that cannot be excluded on other grounds may be used in turn until a path is found. The public address is provided primarily for talk to the router. However, in a practical embodiment switches 218 etc. are aware of the public MAC address of router 204 as well as the specific interface MAC address.

In step 320, the NMS 250 is queried for the hardware MAC addresses of router 204 and target node 208. Where router 204 has more than one MAC address, the MAC address proper to the interface identified in step 312 is selected. Where the MAC address of the target node 208 is not in the NMS 250, the MAC address may be obtained in step 322 by querying an ARP table in router 204. If that query fails, the MAC address of target node 208 may be obtained by an ARP broadcast. Where the MAC address of router 204 is not in the NMS 250, the MAC address may be obtained in step 322 by querying the ARP table in router 204. If that query fails, the MAC address may be obtained by querying an ARP table in the router (not shown) previous to router 204 in the network path from console 202.

In step 324, the router 204 is set as a "current node" for the process, and the NMS 250 is queried for the layer 2 switches 218, 220, 222 that are neighbors to the selected interface on router 204.

In step 326, it is determined whether the current node 204 has at least one neighbor switch 218, 220, 222 that has not yet been queried. If so, the first such switch, for example, switch 218, is selected. In steps 328 and 330, the process queries the FDB of the selected switch to determine whether the selected switch is forwarding packets for the MAC addresses of the router 204 and target node 208. If not, the selected switch is eliminated from the search, and the process returns to step 326 to select another switch. If packets between the router 204 and the target node 208 are being forwarded by the selected switch, the query in step 328 also identifies the ports on the selected switch through which the packets are being forwarded. Depending on the type of switch, the FDB may also identify a virtual local area network (vlan) to which the end node 308 belongs. The vlan is used to allow physically intersecting traffic paths through the switch mesh 214 without interference. Once the vlan number is known, it remains constant along the path through the switch mesh 214, and can be used to simplify queries to subsequent switches of a type that subdivides the FDB number according to vlan number.

If the correct MAC addresses are found, then in steps 332 and 334 the process queries a resource within the selected switch 218, for example, an IEEE.802.1d Port table of the selected switch 218, to confirm that the ports through which the selected switch is set to forward packets between the router 204 and the target node 208 are in the proper forwarding state, and queries a resource within the selected switch 218, for example, an IEEE.802.1d Base table of the selected switch 218 to determine a state of those ports, for example, the IF index of those ports. If the ports are not in the correct state, the selected switch is eliminated, and the process returns to step 326 to select another switch.

If the selected switch 218 is in the forwarding state, then in step 336 the hop to the selected switch 218 is stored as part of the path, and the selected switch 218 is set as the new current node, in place of the router 204.

In step 338, the NMS 250 is queried for the switches 224, 226, 228 that are neighbors connected to the onward port, identified in step 328, of the current node switch 218. Because of the interconnected nature of some switch meshes, the current node switch 218 may have as a neighbor one or more switches that are also neighbors of a switch, or the router 204, that was the current node in a previous iteration of the loop 326 through 338, and that have already been queried and eliminated. Switches that have previously been eliminated from the search are ignored at this stage. The process may also query the port table of the current node switch 218 at this stage, and exclude any port that is not in an active state. It may then be possible for the port state test in step 334 to be omitted. However, in a switch mesh 214 where an active port can be connected to an inactive port, the state of the incoming port in the neighbor switch may be checked in step 334.

The process then returns to step 326, and proceeds to query the neighbor switches 224, 226, 228 of the new current node switch 218. Where the FDB of the current node switch 218 has identified a specific port of switch 218 as the onward port, only the neighbor switch or switches connected to the identified onward port are queried. Where the FDB of the current node switch 218 has identified a specific port of switch 218 as the onward port, and each port is connected to only a single neighbor switch, the iterative process shown in FIG. 5 may become largely linear. Iteration may then occur when incomplete data in one of the tables renders the linear path indefinite.

The loop through steps 226, 328, 330, 332, 334, 336, 338 is repeated as often as necessary, each time adding a further switch 218, 226, 230, 232 to the path stored in step 336. Eventually, the process finds in step 326 that every neighbor switch of the current node switch 232 has been queried, and that no next switch in the path has been found. The process then proceeds to step 340, where it is determined whether one or more switches 318, etc. have been found and stored in step 336. If not, it is concluded either that the target node 208 is directly connected to the router 204, in which case the process proceeds to step 350 below to determine the next stage of tracing the path, or that the process has failed, in which case the process may terminate, or may proceed to step 350. In an embodiment, the process assumes as default that the target node 208 is directly connected to the router 204. However, if an operator has reason to believe that is not correct, the operator may infer the NMS is not correct, for example, because of an undiscovered switch as discussed in step 348 below.

Where a path with one or more switches 218, 226, 230, 232 has been found, in step 344 the process queries the FDB of the last switch found in respect of all vlans, even if the specific vlan to which the target node 208 belongs is already known. In step 346, the process determines whether packets to any other MAC are being forwarded from the same port as the packets to the MAC of target node 208. If that port forwards to more than one MAC, the process infers that a further undiscovered switch is present between the last node 233 in the path and the target node 208. In step 348, the process then adds an undiscovered "mystery switch" to the path, and may notify the console 202 that an undiscovered switch is present in the switch mesh 214.

At step 350, the process determines from the analysis conducted in step 308 whether the source and destination nodes are nodes 208, 210 sharing the same access router 204 or are nodes 208, 212, having different access routers 204, 206. Where the access routers 204, 206 are different, the process proceeds to step 351 to determine whether this is the end of the first pass, tracing the route from router 204 to source node 208. If so, the process loops back to step 312 and repeats the process to construct a path from router 206 through switch mesh 216 to node 212.

If it is determined in step 351 that the second pass, tracing the path from router 206 to destination node 212, has been completed, the process proceeds to step 352, where the layer 3 path between routers 204 and 206 is determined by layer 3 methods which may include methods already known and/or methods to be developed hereafter. Where the path between routers 204, 206 includes a third switch mesh, and it is desired to trace the path through that third switch mesh, the process may return to step 308. The segments of the path from source node 208 to router 204 to router 206 to destination node 212 are then assembled, and the process terminates.

If it is determined in step 350 that the source and destination nodes 208, 210 have the same access router 204, the process proceeds to step 353 to determine whether this is the end of the first pass, tracing the route from router 204 to source node 208. If it is determined in step 353 that the second pass, tracing the path from router 204 to destination node 210, has been completed, the segments of the path from source node 208 to router 204 to destination node 210 are then assembled, and the process terminates.

If it is determined in step 353 that only the path from router 204 to source node 208 has yet been traced, in step 354 the last known switch on the path from router 204 to source node 208 is queried, and in step 356 it is determined whether that switch 232 is forwarding packets with the MAC addresses of both source node 208 and destination node 210. If not, it is inferred that the router 204 is connected to two different switch meshes 214 and 216. In step 358, destination node 210 is set as the target node, while reverting to router 204 as the current node. The process then loops back to step 324 to trace the path through the second switch mesh 216 from router 204 to target node 210.

If the last switch 232 is forwarding packets to the MAC address of target node 210, then it is inferred that the path from source node 208 to destination node 210 passes through the switch mesh 214 and not via the router 204. In that case, in step 360 the last known switch 232 on the path from router 204 to source node 208 is set as the current node, the destination node 210 is set as the target node, and the process loops back to step 324 to trace the path from the current node switch 232 to the target node 210.

Various modifications and variations can be made in the present invention without departing from the spirit or scope of the invention. Thus, it is intended that the present invention cover the modifications and variations of this invention provided they come within the scope of the appended claims and their equivalents. For example, some embodiments correspond to a computer usable medium having computer readable program code embodied therein. When running on a processor in a networked computing system and when provided with a network address of an end device connected to the network, the computer readable program code causes the processor to perform the tracing techniques described herein.

For example, the actual topology of the switch meshes 108, 214, 216 may vary greatly from that shown, both in the number of switches within the switch mesh and in the number of connections to each switch. The connections may form loops, which may be controlled by restricting the forwarding state of some of the ports involved.

For example, although the embodiment of FIG. 5 is described as first tracing a "source" node and then a "destination" node, most electronic communication is two-way, so that either of two communicating nodes may be regarded as the "source" or the "destination." Either of two communicating nodes may be traced first or, at least in the case of source and destination nodes 208, 212 accessed through different routers 204, 206, the two path segments may be traced in parallel. Where routers 204, 206 are different, the layer 3 path between routers 204 and 206 may be traced at a convenient time after routers 204, 206 have been identified.

Various instances have been described where desired or expected information is not found, and alternative information is obtained, or a broadened iterative search is conducted. The extent to which the process uses alternatives before failing with an error state, and the extent to which the process informs a user that expected information was not found, may vary depending on, for example, the design of the network 200, or the preferences of the user, or both.

Although FIGS. 2 and 4 show the target nodes 130, 208, 210, 212 as nodes at the periphery of the networks shown, the target nodes may themselves in some circumstances be routers or other multiply-connected devices within the overall network.

What is claimed is:

1. A method of tracing a path through a layer 2 switch mesh from a first layer 3 device connected to the switch mesh to a second layer 3 device connected to the switch mesh, comprising:
   obtaining, by a processor, hardware addresses of the first and second layer 3 devices;
   identifying, by the processor, a first layer 2 switch that is a neighbor to the first layer 3 device by querying a network management system (NMS) storing an image of the layer 2 switch mesh;
   querying, by the processor, said first layer 2 switch to identify a first port that is forwarding packets having said hardware addresses of the first and second layer 3 devices; and
   tracing the path through the layer 2 switch mesh by iteratively requesting that the NMS identify a subsequent neighboring layer 2 switch and then querying the subsequent neighboring layer 2 switch to identify whether a switch port is actively forwarding communications between the hardware addresses of the first and second layer 3 devices, said iteration being repeated until the NMS fails to identify another subsequent neighboring layer 2 switch.

2. A method according to claim 1, further comprising identifying a second layer 2 switch that is a neighbor to said first layer 2 switch, and querying said second layer 2 switch to identify a second port that is forwarding packets having said hardware addresses of the first and second layer 3 devices.

3. A method according to claim 1, further comprising iteratively identifying layer 2 switches and ports that forward said hardware addresses until a port is reached that has no known neighbors.

4. A method according to claim 1 further comprising, identifying a layer 2 switch port as being directly connected to said second layer 3 device if no layer 2 switches are known to neighbor said layer 2 switch port and if packets from said layer 2 switch port are only forwarded to the hardware address of the second layer 3 device.

5. A method according to claim 1 further comprising, identifying a layer 2 switch port as being connected to said second layer 3 device through an unknown switch if no layer 2 switches are known to neighbor said layer 2 switch port and if packets from said layer 2 switch port are forwarded to the hardware address of the second layer 3 device and to at least one other hardware address.

6. A method according to claim 1, wherein identifying said first layer 2 switch comprises obtaining a list of layer 2 switches that are neighbors from a network management service.

7. A method according to claim 1, wherein the first layer 3 device is a router, further comprising identifying said router by tracing a network path to the second layer 3 device that includes said router.

8. A method according to claim 1, wherein identifying said first layer 2 switch further comprises tracing a path from a third layer 3 device to the first layer 3 device.

9. A method according to claim 8, wherein the third layer 3 device is a router, further comprising identifying said router by tracing a network path to the first layer 3 device that includes said router.

10. A networked computing system, comprising:
a processor; and
a computer-readable storage medium in communication with the processor, the computer-readable medium stores a software program that, when executed, causes the processor to:
trace a network path to a first target layer 3 device, said network path includes a further layer 3 device connected to the first target layer 3 device through a layer 2 switch mesh, said trace performed by:
obtaining hardware addresses of the first target layer 3 device and the further layer 3 device;
identifying a first layer 2 switch that is a neighbor to the further layer 3 device by querying a network management system (NMS) storing an image of the layer 2 switch mesh;
querying said layer 2 switch to identify a first port that is forwarding packets having hardware addresses of the further layer 3 device and the target layer 3 device; and
iteratively requesting that the NMS identify a subsequent neighboring layer 2 switch and then querying the subsequent neighboring layer 2 switch to identify whether a switch port is actively forwarding communications between the hardware addresses of the first and second layer 3 devices, said iteration being repeated until the NMS fails to identify another subsequent neighboring layer 2 switch.

11. The networked computing system according to claim 10, wherein the software program causes the processor to: when provided with a network address of a second target layer 3 device connected to the network, and having traced the path from the further layer 3 device to the first target layer 3 device, to trace a path from the first target layer 3 device to the second target layer 3 device.

12. The networked computing system according to claim 10, wherein the software program causes the processor to trace a network path to an end layer 3 device and to identify the last router before the end layer 3 device as the further layer 3 device.

13. The networked computing system according to claim 10, wherein the software program causes the processor to further identify a second layer 2 switch that is a neighbor to said port, and query said second layer 2 switch to identify a second port that is forwarding packets having said hardware addresses of the first target layer 3 device and the further layer 3 device.

14. The networked computing system according to claim 12, wherein the software program causes the processor to iteratively identify layer 2 switches and ports that forward said hardware addresses until a port is reached that has no known neighbors.

15. The networked computing system according to claim 10, wherein the software program causes the processor to identify a layer 2 switch port as being directly connected to said further layer 3 device if no layer 2 switches are known to neighbor said layer 2 switch port and if packets from said layer 2 switch port are only forwarded to the hardware address of the further layer 3 device.

16. The networked computing system according to claim 10, wherein, if no layer 2 switches are known to neighbor said layer 2 switch port and if packets from said layer 2 switch port are forwarded to the hardware address of the further layer 3 device and to at least one other hardware address, the software program causes the processor to identify a layer 2 switch port as being connected to said further layer 3 device through an unknown switch and to add the unknown switch to a resource from which neighbor layer 2 switches are identified.

17. The networked computing system according to claim 10, wherein the computer program causes the processor to identify layer 2 switches that are neighbors by obtaining a list of layer 2 switches that are neighbors from a network management service.

18. A non-transitory computer readable storage medium storing a computer program that causes a processor to:
trace a network path to an end layer 3 device, the network path includes a further layer 3 device connected to the end layer 3 device through a layer 2 switch mesh, said trace performed by:
obtaining a hardware address of the further layer 3 device;
identifying a first layer 2 switch that is a neighbor to the further layer 3 device by querying a network management system (NMS) storing an image of the layer 2 switch mesh; and
querying said layer 2 switch to identify a first port that is forwarding packets having hardware addresses of the further and end layer 3 devices,
iteratively requesting that the NMS identify a subsequent neighboring layer 2 switch and then querying the subsequent neighboring layer 2 switch to identify whether a switch port is actively forwarding communications between the hardware addresses of the first and second layer 3 devices, said iteration being repeated until the NMS fails to identify another subsequent neighboring layer 2 switch.

19. The computer readable storage medium according to claim 18, wherein the computer program causes the processor to trace a network path to the end layer 3 device and to identify a last router before the end layer 3 device as the further layer 3 device.

20. The computer readable storage medium according to claim 18, wherein the computer program causes the processor to identify a second layer 2 switch that is a neighbor to said port, and query said second layer 2 switch to identify a second port that is forwarding packets having said hardware addresses of the devices.

21. The computer readable storage medium according to claim 20, wherein the computer program causes the processor to iteratively identify layer 2 switches and ports that forward said hardware addresses until a port is reached that has no known neighbors.

22. The computer readable storage medium according to claim 18 wherein the computer program to identify a layer 2 switch port as being directly connected to said further layer 3 device if no layer 2 switches are known to neighbor said layer 2 switch port and if packets from said layer 2 switch port are only forwarded to the hardware address of the further layer 3 device.

23. The computer readable storage medium according to claim 18, wherein, if no layer 2 switches are known to neighbor said layer 2 switch port and if packets from said layer 2 switch port are forwarded to the hardware address of the further layer 3 device and to at least one other hardware address, the computer program causes the processor to identify a layer 2 switch port as being connected to said further layer 3 device through an unknown switch and to add the unknown switch to a resource from which neighbor layer 2 switches are identified.

24. The computer readable storage medium according to claim 18, wherein the computer program causes the processor to identify layer 2 switches that are neighbors by obtaining a list of layer 2 switches that are neighbors from a network management service.

\* \* \* \* \*